United States Patent [19]

Lembke et al.

[11] Patent Number: 4,645,880
[45] Date of Patent: Feb. 24, 1987

[54] DISCONNECT CIRCUIT FOR USE BETWEEN TELEPHONE SWITCHING SYSTEMS

[75] Inventors: Robert W. Lembke, Plant City; Howard J. Wiebeld, Valrico, both of Fla.

[73] Assignee: GTE Communication Systems Corp., Northlake, Ill.

[21] Appl. No.: 655,139

[22] Filed: Sep. 27, 1984

[51] Int. Cl.⁴ .................... H04M 3/12; H04M 7/14
[52] U.S. Cl. ..................................... 379/191; 379/32
[58] Field of Search .......... 179/18 AH, 18 AB, 27 G, 179/18 AD

[56] References Cited

U.S. PATENT DOCUMENTS

| | | | |
|---|---|---|---|
| 3,865,993 | 2/1975 | Synek | 179/18 F |
| 4,049,919 | 9/1977 | Young | 179/18 FA |
| 4,058,685 | 11/1977 | Bowin | 179/18 AH |
| 4,190,745 | 2/1980 | Jusinskas, Jr. et al. | 179/18 AH |

Primary Examiner—Thomas W. Brown
Attorney, Agent, or Firm—Gregory G. Hendricks

[57] ABSTRACT

A disconnect circuit for use between two switching systems. An optical coupler monitors open and closed current loop conditions and provides signals representative thereof. Monostable multivibrators are operated in response to these signals to provide timing signals of predetermined durations. A relay circuit is controlled by these timing signals and it operates to disconnect the loop between the switching systems for a predetermined time.

16 Claims, 1 Drawing Figure

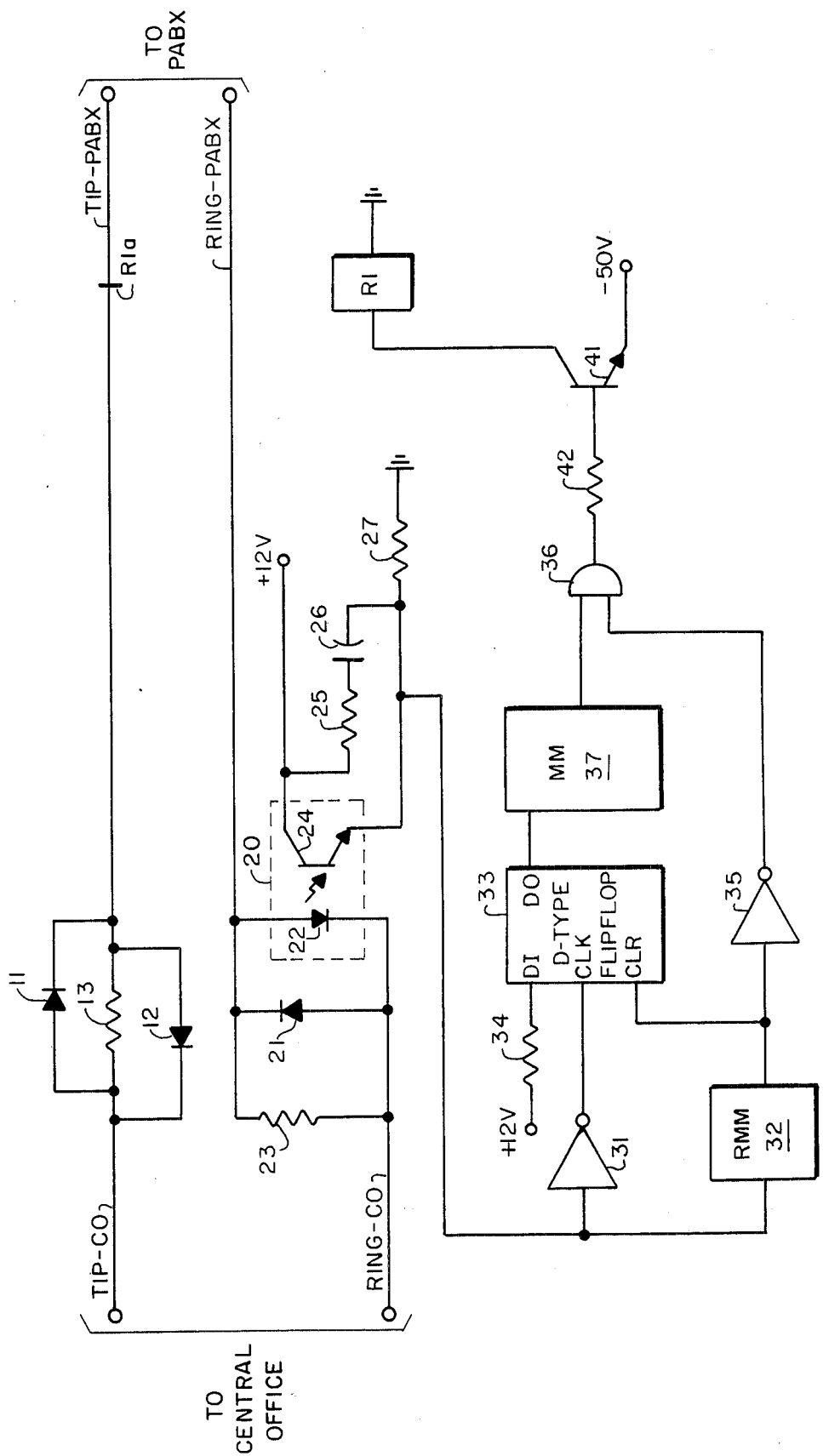

DISCONNECT CIRCUIT FOR USE BETWEEN TELEPHONE SWITCHING SYSTEMS

FIELD OF THE INVENTION

The present invention relates to telephone switching systems and more particularly to a circuit for disconnecting one telephone switching system from another.

BACKGROUND OF THE INVENTION

Many telephone switching systems have idiosyncracies that can cause permanent trunk conditions. These permanent trunk conditions arise when two such connected telephone switching systems attempt to disconnect from each other. When a permanent trunk condition arises misdirected calls and no-ring conditions result.

Many telephone switching systems can initiate a new call in only 32 miliseconds after disconnecting from an associated switching system. However, many other telephone switching systems require substantially more time to disconnect. Therefore, if a first switching system initiates a new call 32 milliseconds after disconnecting from a second switching system which is slower to disconnect, the first switching system may forward a new call into a path that has not been released from a previous call.

An 850 millisecond tip-lead open condition is required between connected switching systems in order to ensure that the second switching system has completely disconnected from the first switching system before the first switching system attempts to forward a new call to the second switching system.

The typical approach for providing this 850 millisecond tip-lead open condition is to use C lead control signals. Such an arrangement does provide improved resolution of the disconnect problem, but use of C lead control signals causes problems in the engineering and administration areas of the telephone operating companies.

The present invention discloses uses an 850 millisecond disconnect circuit which is transparent to the telephone switching systems since it is installed in series with the tip and ring leads.

SUMMARY OF THE INVENTION

In accordance with the present invention, a disconnect circuit is provided for use between first and second switching systems which are operative to open and close a current loop through each other and the disconnect circuit which is connected therebetween.

The disconnect circuit comprises current detection means connected to the first switching system and it is operative in response to the open and closed current loops to provide current detected signals of first and second characteristics, respectively.

The disconnect circuit also includes pulsing means connected to the current detection means and it is operative in response to the current detected signal of a first characteristic to provide a disconnect control pulse of predetermined duration, and further operative in response to the current detected signal of a second characteristic to inhibit the disconnect control pulse for a predetermined time.

The disconnect circuit further includes switching means connected to the pulsing means and to the second switching system, and it is operative in response to the disconnect control pulse to open the current loop for a predetermined time.

DESCRIPTION OF THE DRAWING

The single FIGURE of the accompanying drawing is a schematic diagram of the disconnect circuit of the present invention.

DESCRIPTION OF THE PREFERRED EMBODIMENT

Referring now to the accompanying drawing, the disconnect circuit of the present invention is shown connectable between two telephone switching systems, i.e., a central office and a PABX. Resistor-diode network 11-13 is connectable to the central office via the TIP-CO lead. Similarly resistor-diode network 21-23 is connectable to the central office via the RING-CO lead. Resistor-diode network 11-13 is also connectable to the PABX via relay break contacts R1a and the TIP-PABX lead. Resistor-diode network 21-23 is connectable directly to the PABX via the RING-PABX lead. Diode 22 is a photodiode and it is optically coupled to phototransistor 24, both of which are included in optical coupler 20.

The series combination of resistor 25 and capacitor 26 is connected across phototransistor 24 and resistor 27 is connected between ground and the junction of capacitor 26 and phototransistor 24. This junction is further connected to inverter 31 and retriggerable monostable multivibrator 32. Inverter 31 is connected to the clock (CLK) input of D-type flip-flop 33. The data-in (DI) input of this flip-flop is connected to a 12 volt source via resistor 34. The clear (CLR) input of this flip-flop is connected to the output of retriggerable monostable multivibrator 32. This output is further connected to inverter 35 which is connected to the second input of AND gate 36.

The data-out (DO) output of D-type flip-flop 33 is connected to monostable multivibrator 37 which is further connected to the first input of AND gate 36. The output of AND gate 36 is connected to the base of transistor 41 via resistor 42. The emitter of this transistor is connected to a minus 50 volt source while the collector is connected to ground via relay R1.

D-type flip-flop 33, montostable multivibrator 37 and retriggerable montostable multivibrator 32 are old and well known. Also, the 12 volt and ground references may typically be derived voltages and represent a 12 volt difference in potential rather than actual 12 volt and ground connections.

When a call is not being processed between the central office and the PABX current does not flow in the RING-CO lead and consequently photodiode 22 does not emit light. Therefore phototransistor 14 is turned off and both inverter 31 and retriggerable monostable multivibrator 32 are electrically connected to ground. Retriggerable monostable multivibrator 32 detects this ground connection and provides a logic level 0 signal at its output. This logic level 0 signal is applied to the clear (CLR) input of D-type flip-flop 33. However, a logic level 0 clear signal has no effect on flip-flop 33.

Inverter 31 provides a logic level 1 signal in response to being electrically connected to ground. This logic level 1 signal is applied to the clock (CLK) input of D-type flip-flop 33. A logic level 1 signal is also applied to the data-in (DI) input of this flip-flop since it is connected to the 12 volt source via resistor 34. Consequently, when the logic level 1 clock signal appears at the CLK input, the logic level 1 signal at the DI input is transferred to the data-out (DO) output of flip-flop 33. This logic level 1 signal causes monostable multivibrator 37 to provide an 850 millisecond pulse at its output. Thereafter, a steady logic level 0 signal appears on this output. This logic level 0 signal is applied to the first input of AND gate 36, causing it to provide a logic level 0 signal at its output and thereby cause transistor 41 to be turned off. Consequently, relay R1 is not operated and break contacts R1a are closed.

When a call is placed between the central office and the PABX the disconnector circuit of the present invention is electrically connected therebetween. Consequently, loop current flows through the TIP and RING leads. This loop current also flows through photodiode 22 which then emits light and causes phototransistor 24 to turn on. When phototransistor 24 turns on, it electrically connects the 12 volt source to resistor 27. However, the voltage across resistor 27 does not rise to 12 volts until capacitor 26 charges up to 12 volts. Thus resistors 25 and 27 and capacitor 26 operate as a delay circuit. This delay circuit ensures that a logic level 1 (12 volt) signal appears at the inputs of inverter 31 and retriggerable monostable multivibrator 32 only if phototransistor 24 remains turned on for a predetermined time period defined by the parameters of the delay circuit. These resistive and capacitive parameters are typically chosen to provide a 35 millisecond delay period. The delay circuit thus ensures that the disconnect circuit of the present invention ignores spurious noise pulses and responds only to interruptions in loop current having a duration of 35 milliseconds or more.

When loop current is present for more than the predetermined 35 millisecond delay period, phototransistor 24 does gate the logic level 1 (12 volt) potential appearing at its collector input to the inputs of inverter 31 and retriggerable monostable multivibrator 32. Inverter 31 detects this logic level 1 signal and applies a logic level 0 signal to the clock (CLK) input of D-type flip-flop 33.

Retriggerable monostable multivibrator 32 has a time period of 12 seconds and thus operates as a 12 second enable timer. Therefore this retriggerable monostable multivibrator provides a 12 second logic level 1 output signal in response to a logic level 1 (+12 volt) signal appearing at its input. Since this multivibrator is retriggerable, it re-initiates the 12 second timing period upon each appearance of a logic level 1 signal at its input. Thus, retriggerable monostable multivibrator 32 operates to inhibit the effect of interruptions in loop current caused by dial pulses since each time a dial pulse occurs multivibrator 32 is retriggered. This retriggering then initiates a new 12 second logic level 1 signal at the output of multivibrator 32.

The output signal from this multivibrator will however return to a logic level 0 signal 12 seconds after either the last dial pulse, spurious open condition or reverse battery spike during an answering connection. Thus retriggerable monostable multivibrator 32 operates to ignore such dial pulses, spurious open conditions and reverse battery spikes during answer connections.

As long as the logic level 1 signal appears at the output of retriggerable monostable multivibrator 32, D-type flip-flop 33 is disabled, since this logic level 1 signal also appears at the clear (CLR) input of this flip-flop. When the 12 second timing period expires, retriggerable monostable multivibrator 32 provides a logic level 0 signal at its output and thus the clear condition is removed from the CLR input of D-type flip-flop 33. This flip-flop is then in condition to respond to signals appearing at its clock (CLK) input of 35 milliseconds or longer duration.

When an open condition exists on the tip and ring leads, current ceases to flow through photodiode 22 and it is extinguished. Phototransistor 24 then turns off. If the open condition exsists for more than 35 milliseconds, capacitor 26 discharges and inverter 31 and retriggerable monostable multivibrator 32 will be electrically connected to ground via resistor 27. Such an open loop condition occurs in response to a calling party controlled disconnect signal.

The logic level 0 signal resulting from the ground connection has no effect on retriggerable monostable multivibrator 32. However, inverter 31 responds to this logic level 0 signal by applying a logic level 1 signal to the CLK input of D-type flip-flop 33. This logic level 1 clock signal causes D-type flip-flop 33 to transfer the logic level 1 signal appearing at its DI input to its DO output.

The logic level 1 signal at the DO output of D-type flip-flop 33 then appears at the input of monostable multivibrator 37. This multivibrator provides an 850 millisecond logic level 1 pulse in response to the logic level 1 signal at its input.

Since retriggerable monostable multivibrator 32 has a logic level 0 signal at its input it also has a logic level 0 signal at its output. This logic level 0 output signal appears at the input of inverter 35 which then provides a logic level 1 signal at the second input of AND gate 36. This AND gate then gates the 850 millisecond pulse from monostable multivibrator 37 to transistor 41 via resistor 42. Transistor 41 then turns on for 850 milliseconds and operates relay R1 for the same period of time. Consequently, break contacts R1a are opened for this same 850 millisecond period. Thus, the loop is opened for 850 milliseconds in response to a calling party controlled disconnect signal.

This 850 millisecond open condition gives the PABX sufficient time to disconnect an internal station from the line before the central office can connect a subsequent call to the PABX. Similarly, this circuit gives the central office sufficient time to disconnect an internal station from the line before the PABX can connect a subsequent call to the central office. Thus, erroneous connections between the PABX and the central office are prevented since each is prevented from accessing the other for 850 milliseconds after disconnection.

It will be obvious to those skilled in the art that numerous modifications of the present invention can be made without departing from the spirit of the invention which shall be limited only by the scope of the claims appended hereto.

What is claimed is:

1. A disconnect circuit for use between first and second switching systems which are operative to open and close a current loop through each other and said disconnect circuit which is connected therebetween, said disconnect circuit comprising:

current detection means connected to said first switching system and operative in response to said loop being open or closed to provide current detected signals of first and second characteristics, respectively;

pulsing means connected to said current detection means and operative in response to said current detected signal of a first characteristic to provide a disconnect control pulse of predetermined duration, and further operative in response to said current detected signal of a second characteristic to inhibit said disconnect control pulse for a predetermined time; and switching means connected to said pulsing means and to said second switching system, and operative in response to said disconnect control pulse to open said current loop for a predetermined time.

2. A disconnect circuit as claimed in claim 1, wherein said current detection means is operative in response to said current loop being open for a predetermined time and closed for a predetermined time to provide said current detected signals of first and second characteristics, respectively.

3. A disconnect circuit as claimed in claim 1, wherein said current detection means comprises an otpical coupler.

4. A disconnect circuit as claimed in claim 1, wherein said current detection means comprises an optical coupler and a time delay circuit connected thereto.

5. A disconnect circuit as claimed in claim 4, wherein said time delay circuit comprises a resistive-capacitive network.

6. A disconnect circuit as claimed in claim 1, wherein said pulsing means comprises:
  a first pulse generator connected to said current detection means and operative in response to said current detected signal of a first characteristic to provide said disconnect control pulse of predetermined duration; and
  a second pulse generator connected between said current detection means and said first pulse generator and operative in response to said current detected signal of a second characteristic to provide a disable pulse of predetermined duration;
  said first pulse generator being operative in response to said disable pulse to inhibit said disconnect control pulse for said predetermined time.

7. A disconnect circuit as claimed in claim 6, wherein said second pulse generator comprises a retriggerable monostable multivibrator.

8. A disconnect circuit as claimed in claim 6, wherein said first pulse generator comprises:
  storage means connected to said current detection means and said second pulse generator and operative in response to said current detected signal of a first characteristic to provide an enable signal, and further operative in response to said disable signal to inhibit said enable signal; and
  signalling means connected to said storage means and operative in response to said enable signal to provide said disconnect control pulse of predetermined duration.

9. A disconnect circuit as claimed in claim 8, wherein said storage means comprises an inverter connected to said pulsing means and a D-type flip-flop having a clock input connected to said inverter and a clear input connected to said second pulse generator.

10. A disconnect circuit as claimed in claim 8, wherein said signalling means comprises a monostable multivibrator connected to said storage means.

11. A disconnect circuit as claimed in claim 8, wherein said signalling means comprises a monostable multivibrator connected to said storage means, an inverter connected to said second pulse generator and an AND gate connected to said monostable multivibrator and said inverter;
  said monostable multivibrator being operative in response to said enable signal to provide a gate enable pulse;
  said inverter being operative in response to said disable signal to provide an inverted disable signal; and
  said AND gate being operative in response to said gate enable pulse and an absence of said inverted disable signal to provide said disconnect control pulse of predetermined duration, and further operative in response to said inverted disable signal to inhibit said disconnect control pulse.

12. A disconnect circuit as claimed in claim 1, wherein said switching means comprises:
  a relay driver connected to said pulsing means, a relay connected to said relay driver and including break contacts electrically connected in the current loop between said first and second switching systems.

13. A disconnect circuit as claimed in claim 12, wherein said relay driver comprises a resistor connected to said pulsing means and a transistor connected between said resistor and said relay.

14. A disconnect circuit as claimed in claim 3, wherein said current loop includes a pair of leads connected between said first and second switching systems, said optical coupler comprising a photodiode and a phototransistor connected in optical proximity thereto, said photodiode being included within a first lead of said pair of leads.

15. A disconnect circuit as claimed in claim 14, wherein said current detection means further comprises:
  a diode connected in parallel with said photodiode and in opposite polarity thereto; and
  a resistor connected in parallel with said diode and photodiode.

16. A disconnect circuit as claimed in claim 14, wherein there is further included within the second lead of said pair of leads: a pair of parallel connected and oppositely poled diodes and a resistor connected in parallel with said pair of diodes.

* * * * *